United States Patent
Underwood

(10) Patent No.: US 7,142,885 B2
(45) Date of Patent: Nov. 28, 2006

(54) CELLULAR PHONE CORDLESS HOME BASE UNIT

(76) Inventor: Carl Underwood, 907 Powell Ct., Costa Mesa, CA (US) 92626

(*) Notice: Subject to any disclaimer, the term of this patent is extended or adjusted under 35 U.S.C. 154(b) by 0 days.

(21) Appl. No.: 10/482,847

(22) PCT Filed: Nov. 8, 2002

(86) PCT No.: PCT/US02/35881
§ 371 (c)(1), (2), (4) Date: Jan. 5, 2004

(87) PCT Pub. No.: WO2004/045098
PCT Pub. Date: May 27, 2004

(65) Prior Publication Data
US 2005/0085262 A1 Apr. 21, 2005

(51) Int. Cl.
*H04M 1/00* (2006.01)
*H04Q 7/20* (2006.01)

(52) U.S. Cl. .................. 455/556.1; 455/425; 455/461; 455/462

(58) Field of Classification Search ............. 455/556.1, 455/556.2, 426.1, 558, 457, 418, 425, 461, 455/462, 463, 552.1, 551, 553.1
See application file for complete search history.

(56) References Cited

U.S. PATENT DOCUMENTS

| | | | | |
|---|---|---|---|---|
| 4,593,155 A | * | 6/1986 | Hawkins | 455/411 |
| 5,062,132 A | * | 10/1991 | Yasuda et al. | 455/557 |
| 6,041,229 A | * | 3/2000 | Turner | 455/420 |
| 6,633,759 B1 | * | 10/2003 | Kobayashi | 455/419 |
| 6,741,852 B1 | * | 5/2004 | Mohrs | 455/411 |
| 2002/0072390 A1 | * | 6/2002 | Uchiyama | 455/557 |
| 2002/0102974 A1 | * | 8/2002 | Raith | 455/434 |
| 2002/0168998 A1 | * | 11/2002 | van Winkel | 455/552 |
| 2003/0144030 A1 | * | 7/2003 | Newmark | 455/557 |
| 2005/0020258 A1 | * | 1/2005 | Aslanian | 455/426.1 |
| 2005/0119014 A1 | * | 6/2005 | Bandell et al. | 455/462 |

* cited by examiner

*Primary Examiner*—Lester G. Kincaid
*Assistant Examiner*—Marisol Figueroa
(74) *Attorney, Agent, or Firm*—Rutan & Tucker, LLP

(57) ABSTRACT

A cellular telephone can be integrated in a base unit, and thereby used in addition to, or in place of a land line. Viewed from another perspective, a cellular phone or other communication device can be integrated with a communication network by at least temporarily coupling it to another cellular phone or communication device that was previously integrated with the communication network. Such a unit may integrate itself when coupled to a previously integrated phone by obtaining a MIN and ESN from the previously integrated phone. Such a unit may also provide access to non-integration information contained in the previously integrated phone, such as data related to contacts, tasks, and appointments.

13 Claims, 3 Drawing Sheets

CELLULAR PHONE CORDLESS HOME BASE UNIT

FIELD OF THE INVENTION

The field of the invention is communication systems.

BACKGROUND OF THE INVENTION

In many instances a particular communication device such as a cell phone needs to be integrated into a communication network before it can be used to communicate with users of the network, or to use the network to communicate with users outside the network. Integration into a communication network typically requires that the communication device be provided with integration information that is required for the device to communicate with the network. As an example, a cell phone uses three numbers to integrate it into a communication network, an electronic serial number ("ESN", a mobile identification number ("MIN"), and a system identification code. The ESN is a unique 32-bit number programmed into the phone when it is manufactured. The MIN is a 10-digit number derived from a phone number associated with the phone. The SID is a unique 5-digit number that is assigned to each carrier by the FCC. While the ESN is considered a permanent part of the phone, both the MIN and SID codes are programmed into the phone when a service plan is purchased and the phone activated (i.e. integrated into the communication network). The MIN and ESN paired together form a unique tag for the communication device that is used by the network to determine whether the device should be permitted access to the network.

Cell phones are typically adapted to be held in the palm of a user's hand, and to be operated while being so held. Cell phones are typically mobile communication devices in that the are sized, dimensioned, and otherwise adapted to be operated while being carried. Cell phones can be used to communicate with non-mobile communication devices such as desktop phones that are adapted to be placed on, and possibly attached to, a supporting surface such as a table or wall, and to be operated while being supported by such a surface.

In many instances tradeoffs made while designing cell phones or other devices to be mobile communication devices result in devices that have characteristics that are undesirable, particularly when less mobility is required. As such, users often utilize cell phones while traveling outside their homes and offices, but land line based phones while operating within their homes and offices. Unfortunately doing so requires access to land line based systems, and typically requires subscribing to multiple service plans.

SUMMARY OF THE INVENTION

The present invention is directed to methods and devices facilitating temporary substitution of a first communication device for a second communication device in a communication network by causing the first communication device to obtain integration information from the second communication device. As such, a cellular phone or other communication device can be integrated with a communication network by at least temporarily coupling it to another cellular phone or communication device that was previously integrated with the communication network and obtaining integration information from the previously integrated telephone or device. The cellular telephone to be integrated may be a unit used in place of a mobile cellular phone when the user of such a phone is at a particular location such as his or her home. Such a unit may integrate itself when coupled to a previously integrated phone by obtaining a MIN and ESN from the previously integrated phone. Such a unit may also provide access to non-integration information contained in the previously integrated phone such as data related to contact, tasks, and appointments.

In preferred embodiments, devices to be integrated will comprise one or more cordless handsets and at least one base unit where the one or more handsets are adapted to communicate with the base unit, and the base unit is adapted to be temporarily coupled to a mobile cellular telephone, and to communicate with a cellular telephone network via the network's cell towers. It is contemplated that some embodiments may comprise a base unit having two antennas wherein a first of the two antennas is adapted to transmit signals to and receive signals from the wireless handset and a second of the two antennas is adapted to transmit signals to and receive signals from the communication network.

The devices described herein may be integrated into a communication network by temporarily coupling the communication device to a communication device previously integrated into the communication network; and causing the communication device to be integrated to obtain integration information from the previously integrated communication device. If the preferred devices are used in such a method, the previously integrated communication device is a mobile cellular telephone, the communication network is a cellular telephone network, and the communication device adapted to be integrated into the network is a non-mobile cellular telephone.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
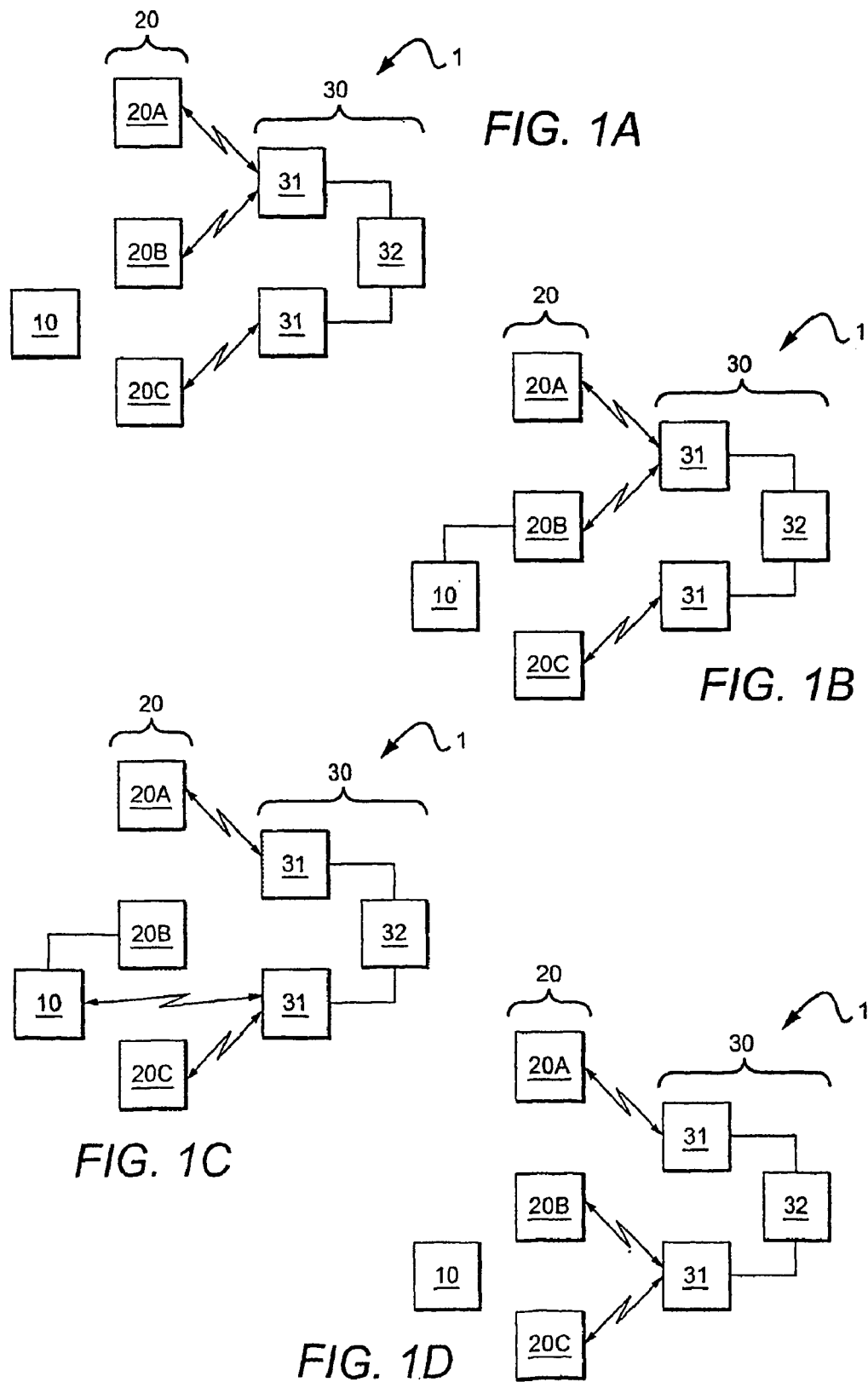
FIG. 1A is a view of the network of FIG. 1A having and a non-integrated communication device.
FIG. 1B is a view of the network and device of FIG. 1A while the device is being integrated into the network.
FIG. 1C is a view of the network and device of FIG. 1A after the device is integrated.
FIG. 1D is a view of the network and device of FIG. 1A after the device as been disocnnected from the network.

In FIG. 1A, mobile communication devices 20 are an integrated part of a communication network 1 that also comprises fixed units 30. Communication device 10 is a device that is to be temporarily substituted for one of devices 20 in network 1 by causing device 10 to obtain integration information from device 20B. If network 1 is a cellular telephone network, fixed units 31 would be cell towers transmitting and receiving signals from mobile cellular telephones 20, and fixed unit 32 would be a mobile telephone switching office (MTSO). In such an instance device 10 would likely also be a cellular telephone (although not necessarily a mobile one) capable of communicating with towers 31 once it is integrated into network 1. Although the devices and methods described are particularly suitable for use with mobile cellular telephone networks, they are also suitable for use in any type of network where a non-integrated device can be integrated by providing it with integration information from a previously integrated device. Integration of a device is intended to indicate that the device can be used to transmit information to and receive information from some portion of the network. In a mobile cellular telephone network, integration of device 10 may be accomplished by providing device 10 with the MIN and ESN of device 20B, but in some mobile cellular telephone networks or other types of networks may require providing device 10 with information other than a MIN and ESN pair from device 20B.

In FIG. 1B, device 10 is coupled to device 20B in order to facilitate device 10 obtaining integration information from device 20B. Such a connection is preferably made by physically coupling device 20B to device 10 via mating electrical connectors, but may be done in any manner that allows device 10 to obtain information from device 20B.

In FIG. 1C, device 10 is still coupled to device 20B, but device 20B has been temporarily disconnected from network 1. It is preferred that any device (such as 20B) coupled to unit 10 be disconnected from (i.e. not communicating with) network 1 while unit 10 is integrated and communicating with network 1. Such disconnection may involve turning off device 20B after integration information is obtained from it, temporarily removing integration information from device 20B, or placing device 20B in a standby mode wherein in remains powered on but does not communicate with network 1. In less preferred embodiments, device 20B may remain integrated with and engage in communications with network 1 even while device 10 is integrated and communicating with network 1.

In FIG. 1D, device 10 has been disconnected from network 1. It is contemplated that in some instances de-coupling device 20B from device 10 will cause device 10 to disconnect itself from network 1. Such a disconnection may simply involve device 10 not using integration information obtained from removed device 20B to communicate with network 1, or may involve deletion of any such obtained integration information from device 10 so as to de-integrate device 10 from network 1. In other instances, device 10 may remain integrated with network 1 even if device 20B is de-coupled from device 10.

Figure 2:
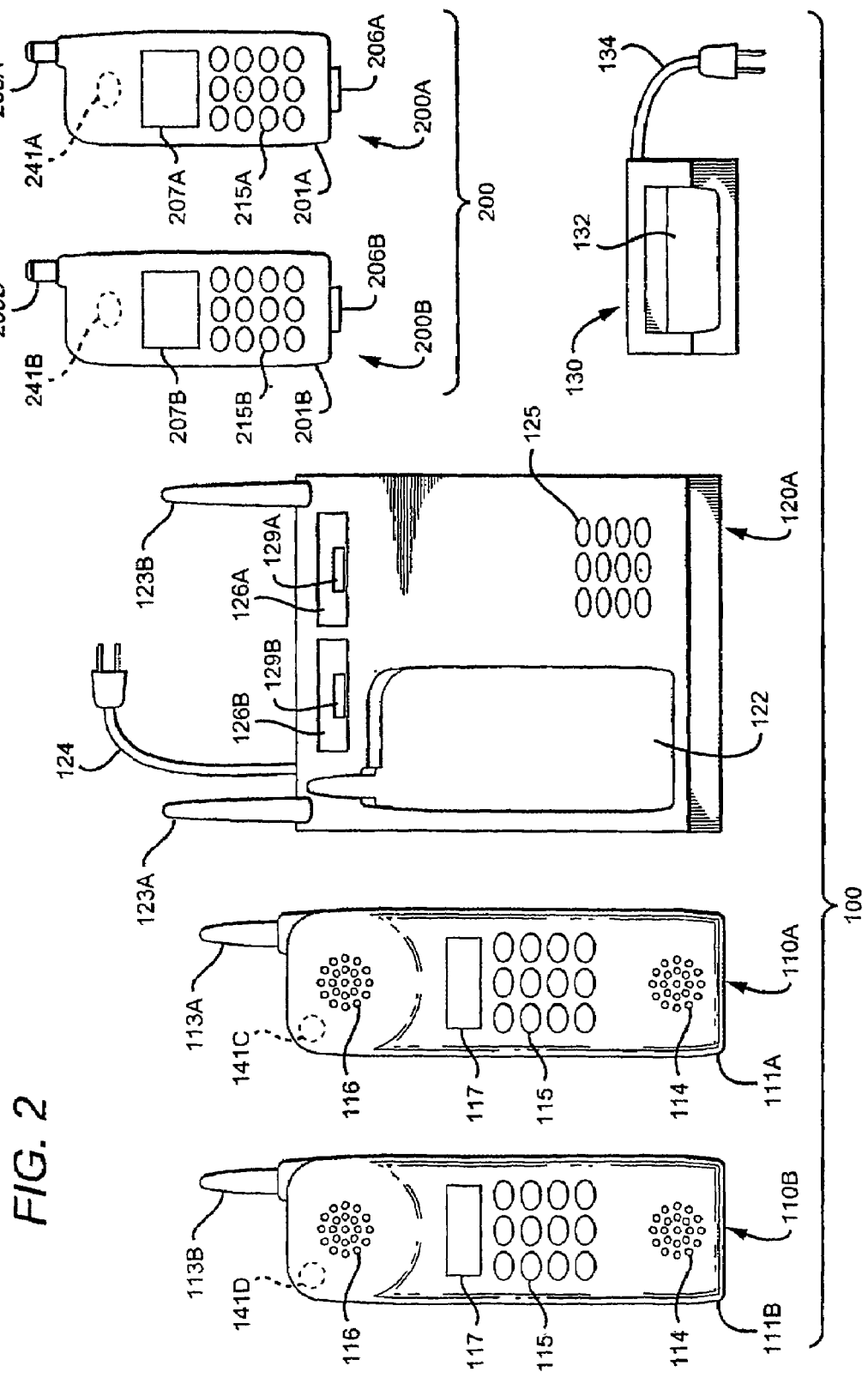
FIG. 2 is a view of a non-mobile cell phone adapted to be integrated into a cellular communication network and a cell phone already integrated into the cellular communication network.

Shown in FIG. 2 are a first cellular telephone 100 and second cellular telephones 200 that are embodiments of devices 10 and 20 of FIGS. 1A–1D. Telephones 100 and 200 are preferably all adapted to communicate with a MTSO (32 in FIGS. 1A–1D) via towers (31 in FIGS. 1A–1D), or directly with other cellular telephones. Telephone 100 is adapted to be integrated into a communication network (such as network 1 of FIGS. 1A–1D) by temporarily coupling telephone 100 to one of telephones 200 (such as 200A or 200B) where telephones 200 are telephones previously integrated into the network, and by subsequently obtaining integration information from one of telephones 200 while such a telephone (200A or 200B) is coupled to telephone 100.

Mobile cellular telephones 200 may comprise any type of cellular telephone integrated into a communication network, where such integration is at least partially dependent on the telephone containing integration information (such as a MIN and ESN). As pictured in FIG. 2, telephones 200 comprise bodies 201A and 201B, antennas 203A and 203B, transceivers 241A and 241B, displays 207A and 207B, keypads 215A and 215B, and male connectors 206A and 206B. Alternative embodiments of telephones 200 may include fewer or additional features to those shown. For example, other types of connectors or means of connection are contemplated, including infrared and wireless.

In the preferred embodiment of FIG. 2, device 100 is a non-mobile telephone comprising at least one handset (110A or 110B) and at least one base unit 120. Telephone 100 may also comprise one or more charging units 130 that include a power cord 134 and a cradle 132 for receiving one of handsets 100A and 110B to permit charging of such a handset without coupling it to base unit 120.

Handsets 110A and 110B are adapted to wirelessly communicate with the base unit 120, and the base unit 120 is adapted to be temporarily coupled to at least one mobile cellular telephone (200A or 200B), and may be adapted to be coupled to at least two mobile cellular telephones 200A and 200B at the same time. As shown in FIG. 2, handsets 110A and 110B comprise bodies 111A and 111B, antennas 113A and 113B, transceivers 141C and 141D, speakers 116, displays 117, microphones 114, and keypads 115. Alternative embodiments of telephones handsets 110A and 110B may include fewer or additional features to those shown, and may coupled to base unit 120 by an optical or electrical conductor.

Figure 3:
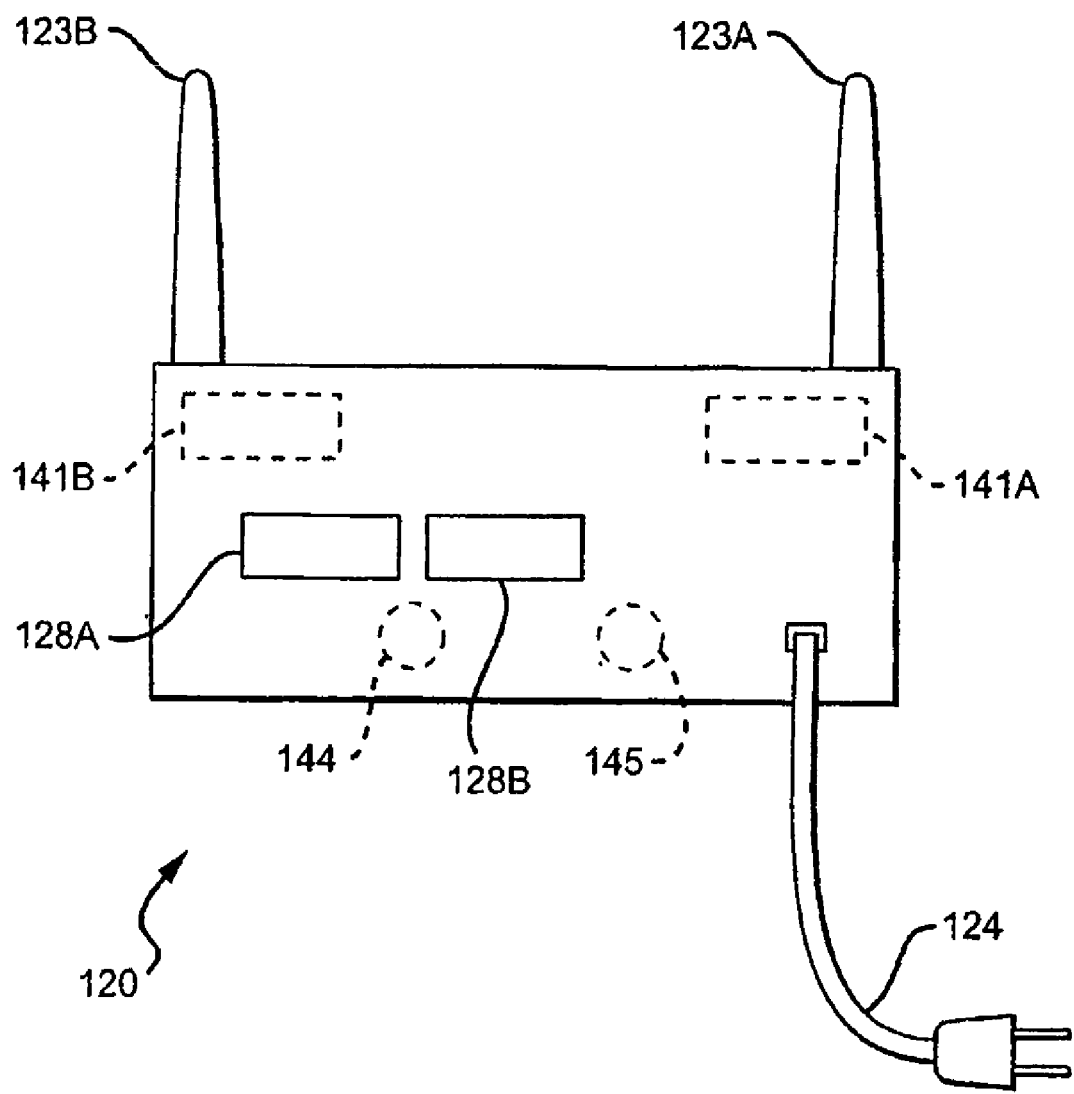
FIG. 3 is a back view of the non-mobile cell phone of FIG. 2.

Base unit 120, as shown in FIGS. 2–3, preferably comprises at least two transceivers 141A and 141B and two antennas 123A and 123B with one antenna and one transceiver being adapted to communicate with wireless handsets 110A and 110B, and the second antenna and transceiver being adapted to communicate with a cellular telephone network (possibly via towers 31 in network 1 of FIG. 1). Base unit 120 is preferred to also comprise at least one mobile cellular phone cradle 129A (and/or 129B), and at least one corresponding charging units 144A (and/or 144B). The embodiment of FIG. 2 comprises two cradles, 129A and 129B. Cradles 129A and 129B facilitate temporarily coupling mobile cellular phones 200A and 200B to base unit 120. As shown in FIG. 2, cradles 129A and 129B each comprise a female connector 126A or 126B adapted to mate with one of connectors 206A and 206B of telephones 200. As shown in FIG. 2, base unit 120 also comprises power cord 124 and keypad 125. Alternative embodiments of base unit 120 may include fewer or additional features to those shown.

It is preferred that base unit 120 be adapted to charge any mobile cellular telephone coupled to it. As such, base unit 120 preferably comprises charging units 144A and 144B to permit charging of mobile cellular 200A and 200B while they are in cradles 129A and 129B.

Base unit 120 may also be adapted to be hardwired to one or more lines of a non-cellular communication network (not shown) via one or more telephone cords. In such an instance, base unit 120 may comprise one or more connectors (128A and 128B in FIG. 3) adapted to receive any such telephone cords. Base unit 120 will typically also comprise a power cord 124. Although some embodiments may permit hardwired connections to non-cellular communication networks, not all embodiments need have this feature.

It is contemplated that telephone 100 will be integrated into a communication network simply by temporarily coupling one of mobile telephones 200 to telephone 100 where coupling one of telephones 200 to telephone 100 causes telephone 100 to obtain integration information from the coupled telephone. Telephone 100 may integrate itself when coupled to one of telephones 200 by obtaining the MIN and ESN from one of telephones 200. In the embodiment of FIG. 2, coupling telephones 200A and 200B to device 100 simply comprises placing telephones 200A and 200B in cradles 129A and 129B of base unit 120 so that the male connectors 206A and 206B of telephones 200 mate with the female connectors 126A and 126B of base 120. In less preferred embodiments, one or more actions may need to be taken after placing telephones 200A and 200B in cradles 129A and 129B in order for base unit 120 to obtain integration information from devices 200A and 200B.

In alternative embodiments, one ore more of telephones 200 may be coupled to base unit 120 without placing those telephones 200 in a cradle. Such embodiments may wirelessly connect one or more telephones 200 to base unit 120, possibly through the use of infrared communications.

In preferred embodiments, handset 110A (and/or 110B) may be used to access non-integration data contained in a mobile cellular telephone 200A (and/or 200B) while telephone 200A (and/or 200B) is coupled to the base unit 120. Such non-integration data may comprise data relating to at least one of the following: contacts, tasks, appointments, calls made, calls received, and calls missed. If multiple cellular telephones are coupled to base unit 120, handset 110A (and/or 100B) preferably provides a mechanism for selecting one of the coupled cellular telephones and accessing the non-integration data contained in the selected phone. It is contemplated that handsets 110A and 110B will provide access to all data and functionality of telephones 200A and 200B. Handsets 110A and 110B may also incorporate any other known telephone feature such as voice activation and dialing.

It is contemplated that base unit 120 may comprising one or more signal amplifiers or other adaptations that permit unit 120 to have a range beyond that of any devices 200 coupled to it. Base unit may also be adapted to be coupled to an external antenna such as an antenna mounted on the roof of the building containing the base unit.

In some embodiments telephone 100 may act as a connection point for connecting an entire local telephone system to a communications network. In such embodiments telephone 100 will be one of many interconnected devices of the local network. As an example, a house, office or other location may comprise a number of telephones connected together by wires, and integrating telephone 100 with a communication network allow any one of the wired together telephones to access the network.

It is important to note that at least partially because telephone 100 is itself a cellular telephone, it need not use any of telephones 200 to transmit and receive data to and from the network it has been integrated into. However, less preferred embodiments may permit one to choose between using telephone 100 or one of telephones 200 to exchange data with the network.

Thus, specific embodiments and applications of cellular phone cordless home base units and related methods and devices save been disclosed. It should be apparent, however, to those skilled in the art that many more modifications besides those already described are possible without departing from the inventive concepts herein. In particular, the methods and/or devices described herein may be used in any communication network wherein communication devices are integrated into the network by providing the device with integration information, particularly when the device to be integrated is a mobile device. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A non-mobile cellular telephone having a first mobile identification number and adapted to be integrated into a cellular telephone network by temporarily coupling the non-mobile cellular telephone to a second cellular telephone having a second mobile identification number previously integrated into the cellular telephone network, and
   the non-mobile cellular telephone is configured to obtain integration information from the second cellular telephone, wherein the non-mobile cellular telephone is capable of remaining integrated into the cellular telephone network when the second cellular telephone is not coupled to the non-mobile cellular telephone;
   wherein the non-mobile cellular telephone comprises a cordless handset and a base unit, the handset is adapted to communicate with the base unit, and the base unit is adapted to be temporarily coupled to a mobile cellular telephone; and
   wherein the base unit is adapted to obtain integration information while it is temporarily coupled to the mobile cellular telephone and to retain such information even if the mobile cellular telephone is uncoupled from the base unit.

2. The communication device of claim 1 wherein the second cellular telephone is a mobile cellular telephone.

3. The communication device of claim 1 wherein the wherein the non-mobile cellular telephone comprises at least two transceivers and two antennas with a first antenna and a first transceiver being adapted to communicate with one or more wireless handsets, and a second antenna and a second transceiver being adapted to communicate with the cellular telephone network.

4. The communication device of claim 1 wherein the integration information comprises an electronic serial number and a mobile identification number.

5. The communication device of claim 1 wherein the wherein the non-mobile cellular phone is adapted to provide access via the cordless handset to non-integration data contained in a mobile cellular telephone coupled to the base unit.

6. The communication device of claim 1 wherein the non-integration data comprises data relating to at least one of the following: contacts, tasks, appointments, calls made, calls received, and calls missed.

7. The communication device of claim 1 wherein the base unit is adapted to charge a battery contained in a mobile cellular telephone while any such telephone is temporarily coupled to the base.

8. The communication device of claim 1 wherein the base unit includes first and second cradles.

9. The communication device of claim 1 wherein the base unit further includes a keypad.

10. The communication device of claim 1 wherein the base unit is adapted to charge a battery contained in a mobile cellular telephone while any such telephone is temporarily coupled to the base.

11. The communication device of claim 1 wherein the base unit includes first and second cradles.

12. The communication device of claim 1 wherein the base unit further includes a keypad.

13. A method of integrating a non-mobile cellular telephone having a first mobile identification number into a cellular telephone network comprising:
- temporarily coupling the non-mobile cellular telephone to a second cellular telephone having a second mobile identification number and previously integrated into the cellular telephone network; and
- causing the non-mobile cellular telephone to be integrated to obtain integration information from the second cellular telephone;
- wherein the second cellular telephone is a mobile cellular telephone;
- wherein the non-mobile cellular telephone comprises a cordless handset and a base unit, the handset is adapted to communicate with the base unit, and the base unit is adapted to be temporarily coupled to a mobile cellular telephone; and
- wherein temporarily coupling a mobile cellular telephone to the base unit causes the base unit to obtain integration information from the mobile cellular telephone and to integrate itself with the network the mobile cellular telephone is integrated with.

* * * * *